(12) United States Patent
Klein et al.

(10) Patent No.: US 11,267,229 B2
(45) Date of Patent: Mar. 8, 2022

(54) RELAXATION OF LAMINATING FILMS TO REDUCE THE ORANGE-PEEL EFFECT ON LAMINATED GLASS PANES

(71) Applicant: SAINT-GOBAIN GLASS FRANCE, Courbevoie (FR)

(72) Inventors: Marcel Klein, Baesweiler (DE); Stefan Lücke, Spenge (DE); Uwe Van Der Meulen, Nideggen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 100 days.

(21) Appl. No.: 16/607,301

(22) PCT Filed: Apr. 13, 2018

(86) PCT No.: PCT/EP2018/059547
§ 371 (c)(1),
(2) Date: Oct. 22, 2019

(87) PCT Pub. No.: WO2018/197235
PCT Pub. Date: Nov. 1, 2018

(65) Prior Publication Data
US 2020/0047464 A1    Feb. 13, 2020

(30) Foreign Application Priority Data
Apr. 28, 2017 (EP) .................................... 17168690

(51) Int. Cl.
*B32B 17/10* (2006.01)

(52) U.S. Cl.
CPC .. *B32B 17/10036* (2013.01); *B32B 17/10174* (2013.01); *B32B 17/1077* (2013.01);
(Continued)

(58) Field of Classification Search
CPC ........ B32B 17/10036; B32B 17/10174; B32B 17/10761; B32B 17/1022; B32B 17/10871
See application file for complete search history.

(56) References Cited

U.S. PATENT DOCUMENTS 3,739,056 A * 6/1973 Evans et al. .............. D01F 6/62
264/235.6
5,158,637 A * 10/1992 Takashige ............... B29C 71/02
156/244.11
(Continued)

FOREIGN PATENT DOCUMENTS

DE    38 34 195 A1    5/1989
DE    197 11 459 A1   9/1998
(Continued)

OTHER PUBLICATIONS

International Search Report as issued in International Phase Application No. PCT/EP2018/059547, dated Jul. 3, 2018.

*Primary Examiner* — George R Koch
*Assistant Examiner* — Christopher C Caillouet
(74) *Attorney, Agent, or Firm* — Pillsbury Winthrop Shaw Pittman LLP (57) ABSTRACT

A method for producing a laminated glass pane that includes a first pane, a first laminating film, a polymer film, a second laminating film, and a second pane, in this order, wherein the polymer film is bonded to the two laminating films, in which method the starting material for the first and the second laminating film is in each case a laminating film in roll form, which, before being used to form the laminated glass pane, is subjected to a pretreatment, in which the laminating film is relaxed by a heat treatment in a non-tensioned state.

16 Claims, 4 Drawing Sheets

(52) U.S. Cl.
CPC ... *B32B 17/10761* (2013.01); *B32B 17/10779* (2013.01); *B32B 17/10788* (2013.01)

(56) References Cited

U.S. PATENT DOCUMENTS

| | | | |
|---|---|---|---|
| 6,261,398 B1 * | 7/2001 | Costa | B32B 17/10972 156/102 |
| 2003/0030164 A1 * | 2/2003 | Van De Velde Keyser | B29C 55/045 264/40.1 |
| 2003/0160350 A1 * | 8/2003 | Shoji | D01F 9/08 264/83 |
| 2015/0013884 A1 | 1/2015 | Yeh et al. | |

FOREIGN PATENT DOCUMENTS

| | | |
|---|---|---|
| DE | 60 100 799 T2 | 7/2004 |
| EP | 2 261 030 A1 | 12/2010 |

* cited by examiner

RELAXATION OF LAMINATING FILMS TO REDUCE THE ORANGE-PEEL EFFECT ON LAMINATED GLASS PANES

CROSS-REFERENCE TO RELATED APPLICATIONS

This application is the U.S. National Stage of PCT/EP2018/059547, filed Apr. 13, 2018, which in turn claims priority to European patent application number 17168690.0 filed Apr. 28, 2017. The content of these applications are incorporated herein by reference in their entireties.

The present invention relates to a method for producing a laminated glass pane, the laminated glass pane obtainable by this production method, and the use of the laminated glass pane thus produced.

Known methods for producing laminated glass panes usually include arranging a base pane, one or more laminating films, and a cover pane and autoclaving the assembly obtained at a high temperature and elevated pressure to obtain the finished laminated glass pane.

In the context of efforts for reducing fuel consumption, efforts are being undertaken to reduce the heating of the vehicle by sunlight. The infrared components of solar radiation lead to heating of the passenger compartment. The heating of the vehicle during relatively long stationary periods in the sun results in increasing energy consumption of the air conditioning system. In addition, the air conditioning system causes increased fuel consumption during operation as well.

One possibility for lessening the heating not only of vehicles but also of building interiors is the reduction of the infrared transmittance of glass panes. For this, primarily used in laminated glazings are polymer films, such as polyolefin films or, in particular, polyester films. These are generally provided with an additional functional coating such as an infrared-reflecting coating.

US 2015/0013884 A1 discloses a method for producing a base pane consisting of a first pane, a first laminating film, a coated polymer film, a second laminating film, and a cover pane having at least one sensor window.

The production of a laminated glass pane with an additional intermediate film, for example, made of polyester, is, however, usually fraught with problems. The differing material properties of a laminating film, for example, PVB, and an intermediate film, e.g., polyester or polyolefin film, can cause the so-called "orange-peel effect", which appears in the finished laminated glass pane after autoclaving and can adversely affect the visual appearance. This orange peel derives from the formation of waves in the composite film of the laminated glass pane, which upon closer observation resemble the appearance of crater landscapes.

The orange-peel effect degrades the aesthetics of the laminated glass pane, particularly when it is pronounced, and is, consequently, undesirable.

DE 197 11 459 A1 and EP 2 261 030 A1 disclose methods for producing a laminated glass pane comprising a first glass pane, a first laminating film, a carrier film, a second laminating film, as well as a second glass pane. In them, the formation of folds of the carrier film is reduced by first forming a pre-bonded pre-laminate of the first glass pane, the first laminating film, and the carrier film with the help of a cover pane, before, after removal of the cover pane, the second laminating film and the second glass pane are placed thereon and the laminated glass pane assembly is finally laminated in the autoclave. As a result of the multistage pre-bonding and final bonding process, the methods disclosed in DE 197 11 459 A1 and EP 2 261 030 A1 are technically complicated.

The object of the present invention consists in eliminating the above-mentioned disadvantages of the prior art. In particular, the object of the present invention consists in providing a method for producing a laminated glass pane, which includes, in addition to the laminating film, other polymer films as an intermediate film, with which an improved visual appearance of the laminated glass pane is obtained compared to laminated glass panes produced by conventional methods. In particular, the occurrence of the orange-peel effect should be reduced or avoided.

The method should also be as simple as possible. In addition, the method should enable continuing to use existing production lines for producing such laminated glass panes according to the customary methods as much as possible without major modifications.

The object of the present invention is accomplished according to the invention by a method for producing a laminated glass pane, a laminated glass pane obtained with the method, and use thereof in accordance with the independent claims. Preferred embodiments of the invention are apparent from the dependent claims.

Accordingly, the invention relates to a method for producing a laminated glass pane that comprises a first pane, a first laminating film, a polymer film, a second laminating film, and a second pane, in said order, wherein the polymer film is bonded to the two laminating films, characterized in that the starting material for the first and the second laminating film is in each case a laminating film in roll form, which, before being used to form the laminated glass pane, is subjected to a pretreatment, in which the laminating film is relaxed by a heat treatment in a non-tensioned state.

With the method according to the invention, laminated glass panes can be obtained with an improved visual appearance, in particular as a result of a reduction in the orange-peel effect compared to laminated glass panes produced by customary methods. The method is relatively simple. In a method variant explained in the following, already existing production lines based on the already known methods can continue to be used without change. Another method variant requires only relatively minor modifications to the existing production lines.

The invention is explained in detail in the following.

In the application, unless otherwise indicated, the expression "tension" or "film tension" means the tension applied to a film in the longitudinal direction or roller direction. Accordingly, "film in the non-tensioned state" or a "non-tensioned film" means a film to which no tension is applied in the longitudinal direction or roller direction. In the method according to the invention, tension in the transverse direction or at right angles to the roller direction generally plays no role; there is also, however, as a rule, no tension on "the film in the non-tensioned state" in the transverse direction during the heat treatment for relaxation.

In the application, unless otherwise indicated, the expression "shrinkage" means the cold shrinkage in the longitudinal direction or roller direction. The determination of the cold shrinkage of a film is established as follows: A sample is stored for 24 hours at 20° C. Then, the length of the sample is measured after storage. The difference between the length of the film before storage (L0) and the length after storage (L1) is determined and the shrinkage S is indicated as a percentage (S [%]=[(L0−L1)/L0]×100). A more precise determination is made by shrinkage measurement on multiple specimens (e.g., 5 specimens) and determination of the mean.

A "bilayer" is a two-layered laminate or a two-layered composite film. A "trilayer" is a three-layered laminate or a three-layered composite film. A film wound on a roll is referred to as "in roll form". Films are typically traded in roll form. "IR" is used here, as customary, as an abbreviation for infrared.

The laminated glass pane produced by the method according to the invention comprises a first pane, a first laminating film, a polymer film, a second laminating film, and a second pane, in said order. In the finished laminated glass pane, the polymer film is bonded to the first and the second laminating film. The laminated glass pane thus includes a composite film or a laminate in which the polymer film is arranged between the two laminating films. The composite film is, in turn, arranged between the two panes.

The first pane and the second pane can be made of the same material or of a different material. The panes can be made of inorganic glass and/or organic glass (polymers). In a preferred embodiment, the first pane and/or the second pane contains glass and/or polymers, preferably flat glass, quartz glass, borosilicate glass, soda lime glass, alkali aluminosilicate glass, polycarbonate, and/or polymethacrylate.

The first pane and the second pane can have the same thickness or different thicknesses. Preferably, the first pane and the second pane have, independently of one another, a thickness in the range from 0.4 to 20 mm, preferably 0.4 to 6 mm.

The first pane and the second pane are also often referred to as "cover pane" and "base pane" or vice versa. With the use of the laminated glass pane, for example, as a vehicle window pane, the base pane is customarily the pane that is the outer glass, whereas the cover pane is the inner glass.

The first pane and the second pane can in each case be planar or curved or arched. The laminated glass panes produced with the method according to the invention can thus be flat or arched glass panes, also referred to as 2D or 3D laminated glass panes.

The first and second laminating film can be made of the same or different materials, but are preferably made of the same material. The first and second laminating film preferably include, independently of one another, polyvinyl butyral (PVB), ethylene vinyl acetate copolymer (EVA, also referred to as EVAC), polyurethane, and/or mixtures thereof and/or copolymers thereof. The first and second laminating film are preferably EVA films or polyvinyl butyral films (PVB films). The first and second laminating film are particularly preferably PVB films.

The first and second laminating film can have the same thickness or a different thickness. The first and second laminating film, e.g., PVB film, preferably have, independently of one another, a thickness of 0.1 to 1.5 mm and more preferably of 0.3 to 0.9 mm.

Suitable laminating films are available commercially. Such laminating films, for example, PVB film or EVA film, are usually supplied in roll form. In the case of rolls, there is tension or tensile stress in the longitudinal direction or the roller direction. PVB films are, for example, obtainable in roll form with a film web length of 500 m. Pieces of film that are cut from these rolls usually have cold shrinkage of approx. 3% to 5%.

The laminating film used as the starting material for the heat treatment for relaxation, for example, PVB film PVA film, is in roll form.

The material of the polymer film is different from the material of the laminating film. The polymer film can, for example, be selected from films of polyethylene terephthalate (PET), polyethylene, polypropylene, polycarbonate, polybutylene terephthalate, polyethylene naphthalate, and/or mixtures and/or copolymers thereof. The polymer film is preferably a polyolefin film or a polyester film, more preferably a polyester film, and particularly preferably a polyethylene terephthalate film. Polycarbonates are also considered polyesters.

In general, material in roll form is also used for the starting material for the polymer film. PET film in roll form has no cold shrinkage; under heat, a certain shrinkage can be detected.

The polymer film, for example, a polyester film, in particular PET film, can, for example, have a thickness in the range from 10 to 200 μm (micrometers), more preferably 20 to 100 μm, particularly preferably 40 to 60 μm.

The polymer film, for example, a polyester film, in particular PET film, preferably has an infrared-reflecting coating or another functional coating. The coating can, for example, include metals, such as Ag, ZnO, $TiO_2$, AlN, and/or mixtures thereof, Ag being preferable. For example, metals such as silver can be vapor deposited on to the polymer film to obtain the coating. The coating, if used, is usually present on only one side of the polymer film; however, two-sided coating may also be done.

In a preferred embodiment, the first and second laminating film are PVB films, and the polymer film is a polyester film, in particular a PET film, with the polyester film optionally having an infrared-reflecting coating.

The method according to the invention is characterized in that the starting material for the first and the second laminating film is in each case a laminating film in roll form, which, before being used to form the laminated glass pane, is subjected to a pretreatment, in which the laminating film in a non-tensioned state is relaxed by a heat treatment. The laminating films relaxed in this manner can then be used in the conventional method to form the laminated glass pane.

The heat treatment of the laminating film for relaxation is preferably carried out in a roll process, in particular a continuous roll process. This can be a roll-to-roll process as described in the following, in which the laminating film, as a starting material, is unwound from a roll and the relaxed laminating film obtained after the heat treatment is wound, after cooling, on a roll for further use, or in which the relaxed laminating film obtained is further used directly, without cooling or optionally with subsequent cooling, to form the bilayer or trilayer and the bilayer or trilayer is wound on a roll for further use.

The laminating film is in the non-tensioned state during the heat treatment for relaxation. In this way, the laminating film can relax during the heat treatment by shrinkage. The shrinkage of the laminating film in the longitudinal direction or roller direction during the heat treatment (heat shrink) can, for example, be in the range from 1% to 13%.

For the film to be in a non-tensioned state, the heat treatment can be done on a separate piece of film. In the preferred roll method, the absence of tension on the laminating film can be achieved by appropriate adjustment of the conveying speed of the rollers or roller pairs and optionally by the positioning of the rollers, as further explained in the following. The shrinkage of the film occurring during the heat treatment must be taken into account. The appropriate measures for adjusting the film tension or the provision of non-tensioned films are familiar to the person skilled in the art.

The non-tensioned laminating film is heated, during the heat treatment for relaxation, preferably up to a temperature in the range from 35° C. to 75° C., more preferably 40° C. to 70° C., particularly preferably 50° C. to 60° C. The temperature mentioned refers to the temperature of the laminating film at the end of the heat treatment.

The duration of the heat treatment for relaxation, in other words, in particular, the dwell time of the laminating film in a furnace or a heating chamber, is preferably in the range from 0.5 to 5 minutes, more preferably 0.5 to 3 minutes, particularly more preferably 0.5 to 2 minutes. The dwell time can be varied as needed. Thus, the online and off-line process can be run at different speeds for the best possible utilization of the plant.

The heat treatment is preferably done in a preheated furnace or a preheated heating chamber. The appropriate temperature in the furnace or in the heating chamber depends, among other things, on the type of furnace or heating chamber, the type of laminating film as well as the desired final temperature and dwell time of the laminating film, but can be, for example, higher by 0° C. to 70° C., preferably 15 to 35° C. than the above-mentioned temperature at the end of the heat treatment. The appropriate temperature, i.e., with heat treatment in a furnace, the temperature of the furnace, is, for example, in the range from 40° C. to 120° C., preferably 60° C. to 100° C.

The heating of the furnace or of the heating chamber or of the laminating film can be carried out, for example, by hot air, microwaves, or IR radiation, IR radiation being preferable. For the IR heating, commercially available IR emitters, also referred to as IR elements, can be used. IR emitters of different types in terms of dimensions, power, and wavelength range are available, for example, from Heraeus. Suitable, for example, are IR elements from Heraeus with the type name "Infrarot Zwillingsrohrstrahler Goldene 8 [Golden 8 Twin-Tube Infrared Emitters]".

The wavelength or the wavelength range emitted by the IR element is selectively coordinated with the material of the laminating film such that the laminating film can absorb the waves emitted, contributing to the heating of the film.

The heat treatment of the laminating film by means of IR radiation is advantageous since, as a result, both passive heating (due to the furnace temperature or heating chamber temperature) and active heating (due to IR absorption) occur.

In the heat treatment by means of IR radiation, it is further advantageous to arrange the IR elements both below and above the film. Thus, more homogeneous heating of the film is achieved. However, it is also conceivable for the IR elements to be arranged only above or only below the film.

The IR elements can be arranged in the longitudinal or the roller direction of the laminating film, with, advantageously, a plurality of IR elements arranged in parallel next to one another over the width of the film. In a preferred embodiment, however, the IR elements are installed transversely to the roller direction over the entire width of the film. In this way, even more homogeneous heating of the film is achieved.

By way of illustration, as a concrete example for the heat treatment for relaxation of the PVB film, the following parameters, which are, however, in no way intended to restrict the invention, can, for example, be used: continuous roll method; film speed 5.6 m/min; furnace or heating chamber with a total length of 4.5 m, in the first section with a total of 2 IR emitters with, in each case, 1 m length in the roller direction provided below and above the film web; additional heating elements are arranged transversely to the to the roller direction in order to achieve homogeneous heating (heating section approx. 2 m/chamber 4.5 m/chamber); furnace temperature 80° C.; dwell time approx. 50 seconds; film temperature at furnace end: approx. 65° C.; IR emitters with peak wavelength of 2400 nm and 1.6 kW. The film was in the non-tensioned state during the heat treatment. This was achieved by suitable adjustment of the conveying speed of the roller pairs used for transporting the film that were arranged upstream and downstream from the heat treatment. After the relaxation treatment, the relaxed film can, for example, after cooling, be wound on a roll for further use.

As already stated, the heat treatment is preferably done in a continuous roll process, wherein no tension is applied to the laminating film. The laminating film is transported by rollers into the furnace for the heat treatment for relaxation. For transport, one roller pair is expediently situated upstream from the heat treatment, preferably at the furnace intake; and one roller pair, downstream from the heat treatment, preferably at the furnace outlet or downstream from an optional subsequent cooling section. A transport system for non-tensioned transport of the laminating film in the furnace is known to the person skilled in the art.

The speed of the roller pair upstream from the heat treatment and the speed of the roller pair downstream from the heat treatment are adjusted such that the laminating film is passed through the furnace without tension. To that end, the roller pair upstream from the heat treatment can transport the laminating film more rapidly than the roller pair downstream from the thermal treatment, with the roller pair upstream from the heat treatment faster by a percentage rate that corresponds roughly to the percentage rate of shrinkage of the film during the heat treatment (e.g., shrinkage, i.e., heat shrinkage, of approx. 1-13%).

The cold shrinkage of the relaxed film obtained is, for example, not more than 4%, preferably not more than 2%, more preferably not more than 1%.

After the heat treatment for relaxation, the relaxed laminating film can, optionally, be cooled, e.g., in a cooling section in the production line. Here, the term "cooling" means active cooling using cooling devices. Conventional cooling devices, for example, cooling tables, are used for the optimum cooling of the relaxed laminating film. The cooling can be done, for example, by air cooled by means of blowers or by blowing cold air. The cooling devices are preferably arranged below and above the laminating film in order to achieve more uniform cooling. However, it is also possible for the cooling devices to be arranged only below or only above the laminating film. In this way, the film temperature can be adjusted as needed.

The optional cooling of the relaxed laminating film can, for example, be expedient for reaching a suitable temperature for winding the film onto a roll or for maintaining the belt tension in the rest of the machine or the production line. These steps are described in detail in the following for the variants off-line or online method.

Apart from the fact that relaxed laminating films are used instead of non-pretreated laminating films, the method according to the invention can be carried out according to the known methods for producing such laminated glass panes. In particular, as in the prior art methods, it is preferable to first produce a bilayer of a laminating film and a polymer film or a trilayer of a first and second laminating film with an interposed polymer film.

In a preferred embodiment, in addition to the relaxation pretreatment described, the method according to the invention further includes, the following steps a) bonding the relaxed first laminating film to the polymer film to form a bilayer or bonding the relaxed first laminating film, the polymer film, and the relaxed second laminating film to form a trilayer, wherein the polymer film is arranged between the first laminating film and the second laminating film,
b) placing the bilayer on the first pane such that the polymer film faces upward, placing the relaxed second laminating film on the polymer film of the bilayer and placing the second pane on the relaxed second polymer film to form an assembly or placing the trilayer on the first pane and placing the second pane on the trilayer to form an assembly, and
c) autoclaving the assembly formed to form the laminated glass pane.

In the method according to the invention, two variants are particularly suitable. In the first variant (off-line method), the relaxed laminating film is produced in a first step. In a separate second step, this relaxed laminating film is then used for the production of a bilayer or trilayer. This variant has the advantage that it requires no modifications at all to the existing production lines for producing bilayers or trilayers. The relaxed laminating film is simply used instead of the non-pretreated laminating film.

In the second variant (online method), the relaxation treatment and the production of the bilayer or trilayer are carried out in a continuous process, in other words, the relaxed laminating film obtained is used directly for the production of a bilayer or trilayer. This variant has the advantage that the production of the bi- or trilayer can be carried out in one operation.

Accordingly, the heat treatment of the laminating film for relaxation can be carried out, in a preferred embodiment (off-line method), in a roll-to-roll method, in which the laminating film used as the starting material is unwound from a roll and fed to the heat treatment for relaxation, after which the relaxed laminating film obtained is wound onto a roll for further use. Between the heat treatment and the winding up, the relaxed laminating film is cooled preferably in a cooling section. Cooling devices, such as cooling tables, are preferably used for the cooling. The cooling can be done, for example, by cooled air using blowers or by blowing with cold air. The cooling devices are preferably arranged below and above the laminating film in order to achieve more uniform cooling; however, they can also be arranged only above or below.

In the alternative preferred embodiment (online method), the heat treatment of the laminating film for relaxation and the formation of the bilayer or trilayer is carried out in a roll-to-roll method, in which the laminating film used as the starting material is unwound from a roll and fed to the heat treatment for relaxation, after which the relaxed laminating film obtained is used directly without cooling or, optionally, after subsequent cooling for the formation of the bilayer or trilayer, and the bilayer or trilayer obtained is wound on a roll for further use. The optional cooling of the relaxed laminating film before use to form the bi- or trilayer can be done in a cooling section by means of cooling devices, such as cooling tables, as described above. The cooling devices are preferably arranged below and above the laminating film in order to achieve more uniform cooling; however, they can also be arranged only above or below.

To produce the bilayer, the relaxed first laminating film is bonded to the polymer film. To produce the trilayer, the relaxed first laminating film, the polymer film, and the relaxed second laminating film are bonded to one another, with the polymer film arranged between the first laminating film and the second laminating film.

During the formation of the bi- or trilayer, the laminating film or the laminating films must be heated under tension in order to establish adhesion to the polymer film. The heating of the films can be realized, for example, by using heated rollers. The temperature of the films for producing the bilayer or trilayer is known to the person skilled in the art.

Through heating under tension during the formation of the bi- or trilayer, cold shrinkage in the range from, for example, 0 to 4% can absolutely develop, just as with the conventional methods.

The next step is the arrangement of the components of the laminated glass pane. For this, pieces (also referred to in the art as sheets) of suitable shape are cut from the composite film (bi- or trilayer) and, optionally, from the second relaxed laminating film.

When using the bilayer, the bilayer is placed on the first pane such that the polymer film faces upward. After that, the relaxed second laminating film is placed on the polymer film of the bilayer; and, then, the second pane is applied on the relaxed second laminating film to form the assembly. When using the trilayer, the trilayer is placed on the first pane; and, after that, the second pane is placed on the trilayer to form the assembly.

The assembly formed can, optionally, be pre-fixed, for example, by spot heating or with adhesive tape.

In a preferred embodiment, the assembly formed can be deaerated before the autoclaving operation, for example, by placement in a vacuum bag and evacuation in order to remove air from the assembly. Various other processes for deaeration are known to the person skilled in the art.

The assembly formed is then autoclaved to form the laminated glass pane in a conventional manner. This is done in an autoclave at elevated temperature and elevated pressure.

The assembly is, for example, autoclaved at a temperature in the range from 80 to 150° C., preferably from 90° C. to 145° C., and/or at an absolute pressure from 7 bar to 16 bar, preferably from 8 bar to 14 bar, more preferably 10 bar to 13 bar. Preferably, the assembly is exposed for 10 min to 120 min, more preferably for 30 min to 60 min to the maximum temperature and the maximum pressure provided for the autoclaving.

After autoclaving, the assembly can be cooled to obtain the finished laminated glass pane. The laminated glass pane produced with the method according to the invention has, compared to a prior art laminated glass pane, a reduced orange-peel effect and thus improved optics.

The invention also relates to a laminated glass pane obtainable with the above-described method.

The invention further relates to the use of a laminated glass pane produced in accordance with the above-described method as a vehicle window pane, in particular for motor vehicles, watercraft pane or aircraft pane, as structural glazing, architectural glazing, or furniture glazing. The laminated glass pane can, for example, be a windshield, rear window, side window, or partition window, in particular for motor vehicles.

In the following, exemplary embodiments of the invention are described in detail with reference to the accompanying drawings.

Figure 1:
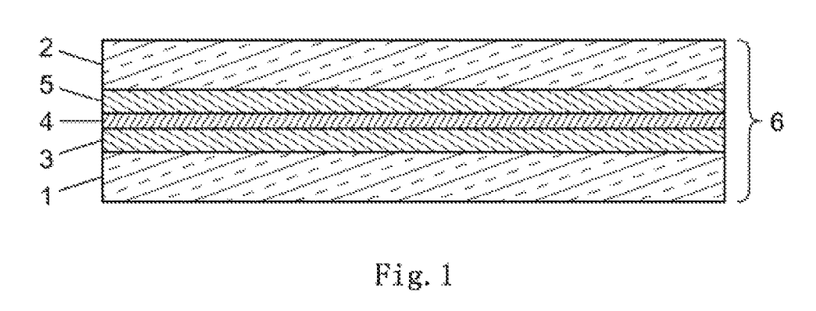

FIG. 1 depicts a schematic cross-section of the laminated glass pane 6 produced by the method according to the invention that comprises a first pane 1, a first laminating film 3, a polymer film 4, a second laminating film 5, and a second pane 2. The laminating films 3, 5 are, for example, made of PVB. The polymer film 4 is, for example, made of PET and has, optionally, an infrared-reflecting coating.

Figure 2A:
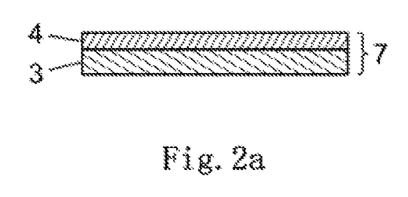

FIG. 2a depicts a schematic cross-section of a bilayer 7, which has a laminating film 3 and a polymer film 4 as a composite film.

Figure 2B:
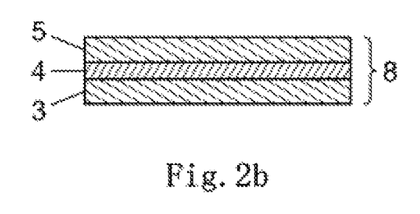

FIG. 2b depicts a schematic cross-section of a trilayer 8, which has a first laminating film 3, a polymer film 4, and a second laminating film 5 as a composite film.

Figure 3:
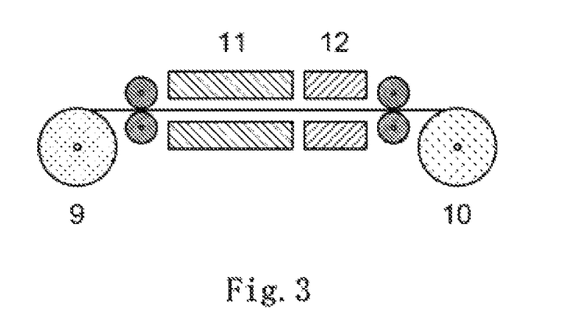

FIG. 3 schematically depicts the relaxation treatment for the laminating film in a roll-to-roll process. The laminating film 9 supplied in roll form by the manufacturer is unwound and fed to a heating section 11 via conveyor rollers arranged as roller pairs at the beginning and end of the heat treatment, in which heating section the laminating film is heat-treated in a non-tensioned state. Used for the heating are IR elements that are arranged below and above the laminating film. After the heat treatment for relaxation, the laminating film is cooled in a cooling section 12. For this, conventional cooling tables that are expediently arranged below and/or above the laminating film can, for example, be used. After the heat treatment for relaxation and the subsequent cooling, the relaxed and cooled laminating film 10 obtained is wound onto a roll for further use. The shrinkage of the laminating film in the roller direction due to the heat treatment can be approx. 1 to 13%. The absence of tension on the laminating film during the heat treatment is ensured in that the roller pair at the beginning of the heat treatment transports faster than the roller pair downstream from the heat treatment, with the percentage difference in speeds corresponding approx. to the percentage shrinkage of the laminating film due to the treatment. A concrete example for suitable parameters for such heat treatment for relaxation of the PVB film was already stated above.

Figure 4:
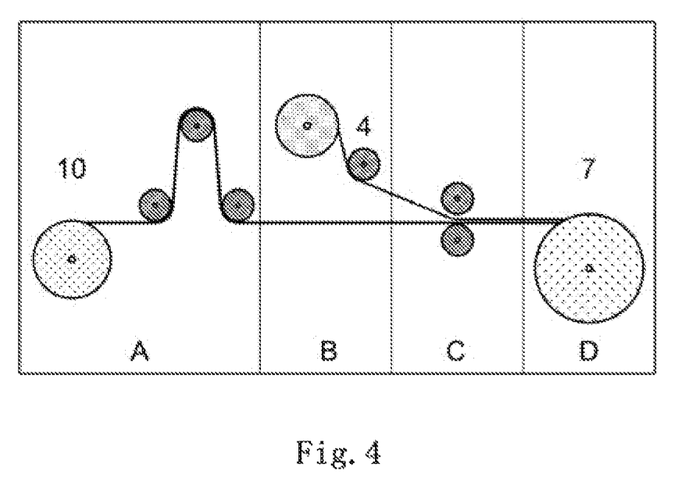

FIG. 4 depicts schematically the production of a bilayer with the relaxed laminating film 10 produced according to FIG. 3 (off-line mode). Apart from the use of the relaxed laminating film the production corresponds to the prior art. In step A, the relaxed laminating film, for example, a relaxed PVB film, treated according to FIG. 3, is unwound. In step B, the polymer film 4, for example, a PET film, is unwound. In step C, the relaxed laminating film 10 and the polymer film 4 are bonded by pressing and heating forming a bilayer 7, which, after a cooling step (not shown), is wound onto a roll (step D) for further use.

Figure 5:
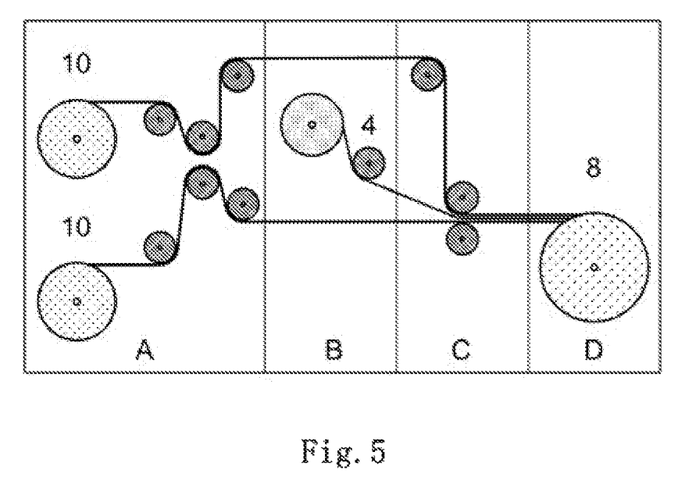

FIG. 5 depicts schematically the production of a trilayer with two relaxed laminating films 10 produced according to FIG. 3 (off-line mode). Apart from the use of the relaxed laminating films, the production corresponds to the prior art. In step A, the relaxed first and second laminating films, e.g., relaxed PVB films, are unwound. In step B, the polymer film 4, e.g., a PET film, is unwound. In step C, the two relaxed laminating films 10 and the interposed polymer film 4 are bonded by pressing and heating forming a trilayer 8, which, after a cooling step (not shown) is wound onto a roll (step D) for further use.

Figure 6:
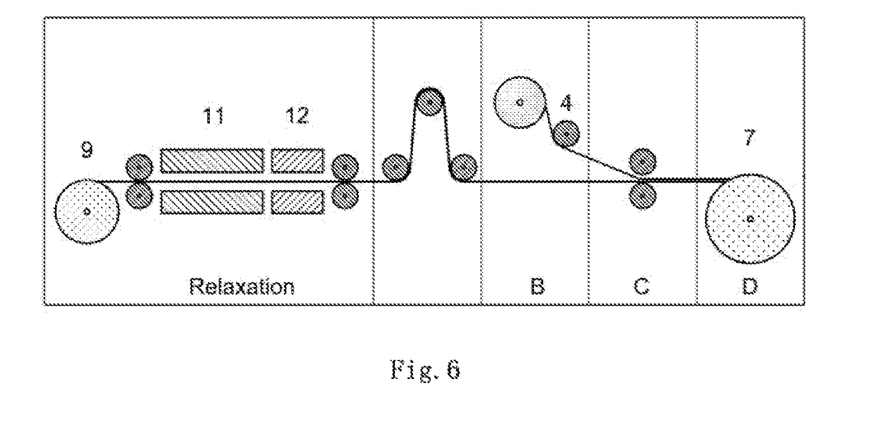

FIG. 6 depicts schematically the production of a bilayer according to the embodiment in which the relaxed laminating film obtained after the relaxation treatment is further processed directly in a continuous method for the formation of a bilayer in a roll-to-roll method (online mode). Here, the laminating film 9, e.g., PVB film, supplied in roll form by the manufacturer is unwound and fed via conveyor rollers arranged as roller pairs at the beginning and end of the heating treatment to a heating section 11, in which the laminating film is heat-treated in a non-tensioned state. IR elements that are arranged below and/or above the laminating film are used for the heating. After the heat treatment for relaxation, the relaxed laminating film is cooled in a cooling section 12. For this, for example, conventional cooling tables that are expediently arranged below and/or above the laminating film can be used. The cooling step depicted here after the heat treatment for relaxation is optional and can, optionally, be omitted. With regard to the shrinkage of the laminating film in the roller direction due to the heat treatment and ensuring the absence of tension of the laminating film during the heat treatment, what was said regarding the method of FIG. 3 applies accordingly. The relaxed laminating film obtained is used directly in a continuous method for producing a bilayer. In step C, it is bonded, by pressing and heating, to the polymer film 4, e.g., a PET film, unrolled in step B to form a bilayer 7, which is wound on a roll (step D) for further use after a cooling step (not shown).

Figure 7:
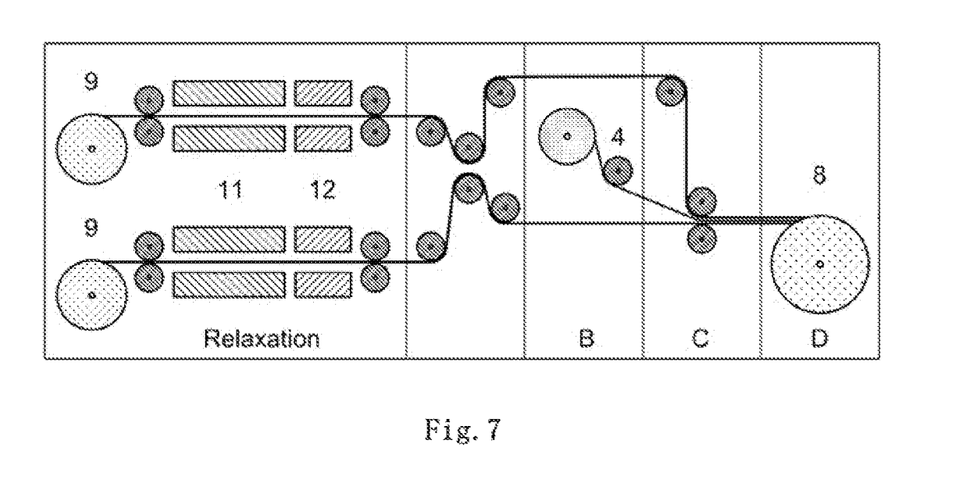

FIG. 7 depicts schematically the production of a trilayer according to the embodiment in which the relaxed first and second laminating film obtained after the relaxation treatment is further processed directly in a continuous method for the formation of a trilayer in a roll-to-roll method (online mode). Here, two laminating films 9, e.g., PVB film, supplied in roll form by the manufacturer are, in each case, unwound and fed via conveyor rollers arranged as roller pairs at the beginning and end of the heat treatment to a heating section 11, in which the first and second laminating film are heat-treated in a non-tensioned state. IR elements that are arranged below and/or above the laminating film are used for the heating. After the heat treatment for relaxation, the relaxed laminating film is cooled in a cooling section 12. For this, for example, conventional cooling tables that are expediently arranged below and/or above the laminating film can be used. The cooling step depicted here after the heat treatment for relaxation is optional and can, optionally, be omitted. With regard to the shrinkage of the laminating film in the roller direction due to the heat treatment and ensuring the absence of tension of the laminating film during the heat treatment, what was said regarding the method of method of FIG. 3 applies accordingly. The relaxed first and second laminating films obtained are used directly in a continuous method for producing a trilayer. In step C, they are bonded, by pressing and heating, to the polymer film 4 e.g., a PET film, unrolled in step B to form a trilayer 8 with the polymer film in the middle of the composite film, which is wound on a roll (step D) for further use after a cooling step (not shown).

Figure 8:
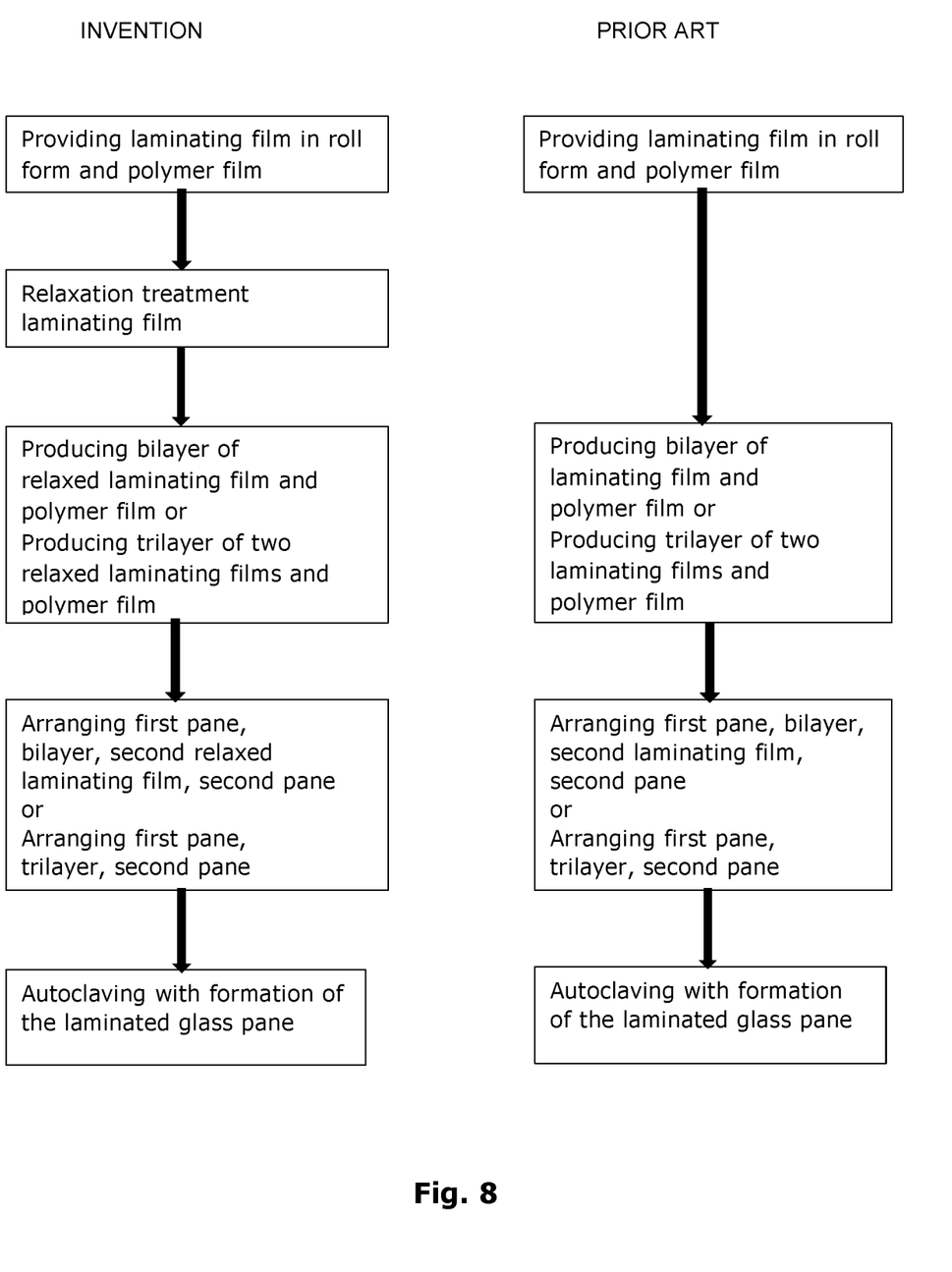

FIG. 8 depicts a flowchart of the method according to the invention compared to a prior art method.

With the use of a bilayer or trilayer produced according to FIG. 4 or FIG. 5 for producing a laminated glass pane as described above, there is a reduced orange-peel effect compared to laminated glass panes that are produced using the same method, except that the laminating films used had not been subjected to the relaxation treatment according to the invention.

LIST OF REFERENCE CHARACTERS 1 first pane
2 second pane
3 first laminating film
4 polymer film
5 second laminating film
6 laminated glass pane
7 bilayer
8 trilayer
9 laminating film in roll form, commercial product
10 relaxed laminating film
11 heating section (e.g., IR elements)
12 cooling section A unwinding relaxed laminating film(s)
B unwinding polymer film
C bonding by pressing and heating
D winding bilayer or trilayer

The invention claimed is:

1. Method for producing a laminated glass pane that comprises a first pane, a first laminating film, a polymer film, a second laminating film, and a second pane, in said order, wherein the polymer film is bonded to the first and second laminating films, wherein the starting material for the first and the second laminating film is in each case a laminating film in roll form, the method comprising, before being used to form the laminated glass pane, subjecting the laminating film in roll form to a pretreatment, in which the laminating film is relaxed by a heat treatment in a non-tensioned state, wherein the heat treatment for relaxation of the laminating film is carried out in a furnace, wherein for the heat treatment for relaxation, the laminating film is passed through the furnace by rollers, and wherein a speed of a pair of rollers before the heat treatment and the speed of a pair of rollers after the heat treatment are adjusted such that the laminating film is passed through the furnace without tension,
wherein a percentage difference in speeds of the pair of rollers before the heat treatment and of the pair of rollers after the heat treatment is selected to correspond to a percentage shrinkage of the laminating film due to the heat treatment.

2. The method for producing a laminated glass pane according to claim 1, further comprising:
a) a1) bonding the relaxed first laminating film to the polymer film to form a bilayer or a2) bonding the relaxed first laminating film, the polymer film, and the relaxed second laminating film to form a trilayer, wherein the polymer film is arranged between the first laminating film and the second laminating film,
b) b1) placing the bilayer on the first pane such that the polymer film faces upward, placing the relaxed second laminating film on the polymer film of the bilayer, and placing the second pane on the relaxed second laminating film to form an assembly or b2) placing the trilayer on the first pane and placing the second pane on the trilayer to form an assembly, and
c) autoclaving the assembly formed to form the laminated glass pane.

3. The method for producing a laminated glass pane according to claim 1, wherein the non-tensioned laminating film is heated in the heat treatment up to a temperature in the range from 35° C. to 75° C.

4. The method for producing a laminated glass pane according to claim 3, wherein the non-tensioned laminating film is heated in the heat treatment up to a temperature in the range from 40° C. to 70° C.

5. The method for producing a laminated glass pane according to claim 4, wherein the non-tensioned laminating film is heated in the heat treatment up to a temperature in the range from 50° C. to 65° C.

6. The method for producing a laminated glass pane according to claim 1, wherein the duration of the heat treatment for relaxation is in the range from 0.5 to 5 minutes.

7. The method for producing a laminated glass pane according to claim 6, wherein the duration of the heat treatment for relaxation is in the range from 0.5 to 2 minutes.

8. The method for producing a laminated glass pane according to claim 1, wherein the laminating film is cooled after the heat treatment for relaxation.

9. The method for producing a laminated glass pane according to claim 1, wherein the heat treatment for relaxation is carried out in a continuous roll process.

10. The method for producing a laminated glass pane according to claim 1, wherein the heat treatment of the laminating film for relaxation is carried out in a roll-to-roll method, in which the laminating film used as the starting material is unwound from a roll and fed to the heat treatment for relaxation, after which the relaxed laminating film obtained is cooled and wound on a roll for further use, or
wherein the heat treatment of the laminating film for relaxation and the formation of the bilayer or trilayer is carried out in a roll-to-roll method, in which the laminating film used as the starting material is unwound from a roll and fed to the heat treatment for relaxation, after which the relaxed laminating film obtained is used directly for the formation of the bilayer or trilayer and the bilayer or trilayer obtained is wound on a roll for further use, wherein the relaxed laminating film is optionally cooled between the heat treatment and the formation of the bilayer or trilayer.

11. The method for producing a laminated glass pane according to claim 1, wherein the cold shrinkage of the relaxed laminating film obtained after the heat treatment is less than 4%.

12. The method for producing a laminated glass pane according to claim 1, wherein the first and second laminating film include, independently of one another, polyvinyl butyral, ethylene vinyl acetate copolymer, polyurethane, and/or mixtures thereof and/or copolymers thereof, and/or wherein the polymer film includes polyethylene terephthalate, polyethylene, polypropylene, polycarbonate, polybutylene terephthalate, polyethylene naphthalate, and/or mixtures and/or copolymers thereof.

13. The method for producing a laminated glass pane according to claim 12, wherein the first and second laminating film are polyvinyl butyral films and/or ethylene vinyl acetate copolymer films, and, wherein the polymer film is a polyester film or polyolefin film.

14. The method for producing a laminated glass pane according to claim 1, wherein the first and second laminating film are polyvinyl butyral films and/or the polymer film is a polyethylene terephthalate film.

15. The method for producing a laminated glass pane according to claim 1, wherein the polymer film has an infrared-reflecting coating.

16. The method for producing a laminated glass pane according to claim 1, wherein the heat treatment for relaxation of the laminating film is carried out in the furnace using hot air, microwaves, or IR radiation.

* * * * *